US011416608B2

United States Patent
Momeni Milajerdi et al.

(10) Patent No.: US 11,416,608 B2
(45) Date of Patent: Aug. 16, 2022

(54) LAYERED ANALYSIS FOR NETWORK SECURITY RISK DETECTION

(71) Applicant: Microsoft Technology Licensing, LLC, Redmond, WA (US)

(72) Inventors: Sadegh Momeni Milajerdi, Emeryville, CA (US); Mariusz H. Jakubowski, Bellevue, WA (US); Jugal Parikh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 16/888,002

(22) Filed: May 29, 2020

(65) Prior Publication Data
US 2021/0374237 A1    Dec. 2, 2021

(51) Int. Cl.
*G06F 21/55* (2013.01)
*H04L 9/40* (2022.01)

(52) U.S. Cl.
CPC ............ *G06F 21/554* (2013.01); *H04L 63/02* (2013.01); *H04L 63/0263* (2013.01); *G06F 2221/034* (2013.01)

(58) Field of Classification Search
CPC . H04L 63/02; H04L 63/0263; H04L 63/1425; G06F 21/554; G06F 2221/034; G06F 21/552

(Continued)

(56) References Cited

U.S. PATENT DOCUMENTS

| 8,584,241 B1* | 11/2013 | Jenks | G06F 21/566 |
| | | | 726/24 |
| 2004/0172557 A1* | 9/2004 | Nakae | H04L 63/0263 |
| | | | 726/22 |

(Continued)

FOREIGN PATENT DOCUMENTS

| EP | 3531325 | 8/2019 |
| WO | 2020006415 | 1/2020 |

OTHER PUBLICATIONS

"International Search Report & Written Opinion Issued in PCT Application No. POT/US2021/032877" dated Aug. 9, 2021, 24 Pages.

(Continued)

*Primary Examiner* — Venkat Perungavoor
*Assistant Examiner* — Peiliang Pan
(74) *Attorney, Agent, or Firm* — Schwegman Lundberg & Woessner, P.A.

(57) ABSTRACT

Events within a computer system are grouped in order to identify security threats and, in some cases, perform an action to mitigate the threat. In some aspects, a computing system event that meets a criterion, are identified. A first layer of computing resources is determined which includes computing resources referenced during the computing system event. A second layer of computing resources is then determined, the second layer including one or more of a parent process or file loaded by the first layer processes, a process writing to a file included in the first layer of computing resources, or a previous version of a file included in the first layer of computing resources. Similarities between computing resource pairs in the first and second layers are determined, and a group of high similarity pairs related to each other is identified. In some embodiments, a mitigating action is identified based on the group.

20 Claims, 9 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2016/0191466 | A1* | 6/2016 | Pernicha | H04L 63/20 726/1 |
| 2016/0352760 | A1* | 12/2016 | Mrkos | H04L 67/303 |
| 2017/0272462 | A1* | 9/2017 | Kraemer | G06F 21/52 |
| 2018/0341770 | A1* | 11/2018 | Aoyama | G06F 21/52 |
| 2020/0007560 | A1* | 1/2020 | Niemela | H04L 63/1441 |
| 2020/0120118 | A1* | 4/2020 | Shu | H04L 63/1425 |

OTHER PUBLICATIONS

"Implementing Layered Security to Protect Against Modern Malware", Retrieved From: https://www.newnettechnologies.com/implementing-layered-security-to-protect-against-modern-malware.html, Retrieved on: Feb. 1, 2021, 7 Pages.

Bhatt, et al., "A Cyber Security Situational Awareness Framework to Track and Project Multistage Cyber Attacks", In Proceedings of the 9th International Conference on Cyber Warfare and Security, Mar. 2014, 6 Pages.

Briesemeister., et al., "Detection, Correlation, and Visualization of Attacks Against Critical Infrastructure Systems", In Proceedings of 8th International Conference on Privacy, Security and Trust, Aug. 17, 2010, 8 Pages.

Limmer, et al., "Survey of Event Correlation Techniques for Attack Detection in Early Warning System", In Technical Report of University of Erlangen, Department of Computer Science, , Apr. 2008, 37 Pages.

Milajerdi, et al., "HOLMES: Real-Time APT Detection through Correlation of Suspicious Information Flows", Retrieved from: https://www.ieee-security.org/TC/SP2019/SP19-Slides-pdfs/Sadegh_Momeni_-_13-Sadegh-Momeni-Real-time_APT_Detection_through_Correlation_of_Suspicious_Information_Flows.pdf, 2019, 24 Pages.

Milajerdi, et al., "HOLMES: Real-Time APT Detection through Correlation of Suspicious Information Flows", In IEEE Symposium on Security and Privacy, May 19, 2019, pp. 1137-1152.

Milajerdi, et al., "POIROT: Aligning Attack Behavior with Kernel Audit Records for Cyber Threat Hunting", In Proceedings of the Conference on Computer and Communications Security, Nov. 6, 2019, 17 Pages.

Zhang, Ellen, "What is Event Correlation? Examples, Benefits, and More", Retrieved From: https://digitalguardian.com/blog/what-event-correlation-examples-benefits-and-more, Sep. 12, 2018, 8 Pages.

* cited by examiner

LAYERED ANALYSIS FOR NETWORK SECURITY RISK DETECTION

BACKGROUND

The increasing sophistication and impact of modern cyberattacks pose grave dangers to computer users and systems world-wide. Moreover, security compromises are often buried within vast lakes of logs and telemetry. Additionally, many cyberattacks are distributed in nature. For example, if an attacker is able to gain access to a computer system, in some cases, the attack distributes itself across multiple computers or devices. Some attacks also include multiple different components, which behave differently, and via multiple attack vectors, attack different portions of the computer system, making it difficult to identify relationships between these multiple attack vectors once they have become established within a computer system. Faced with such challenges, today's security analysts require ever more powerful and efficient approaches to deal with bad actors and their evolving behavior.

DETAILED DESCRIPTION

Figure 1:
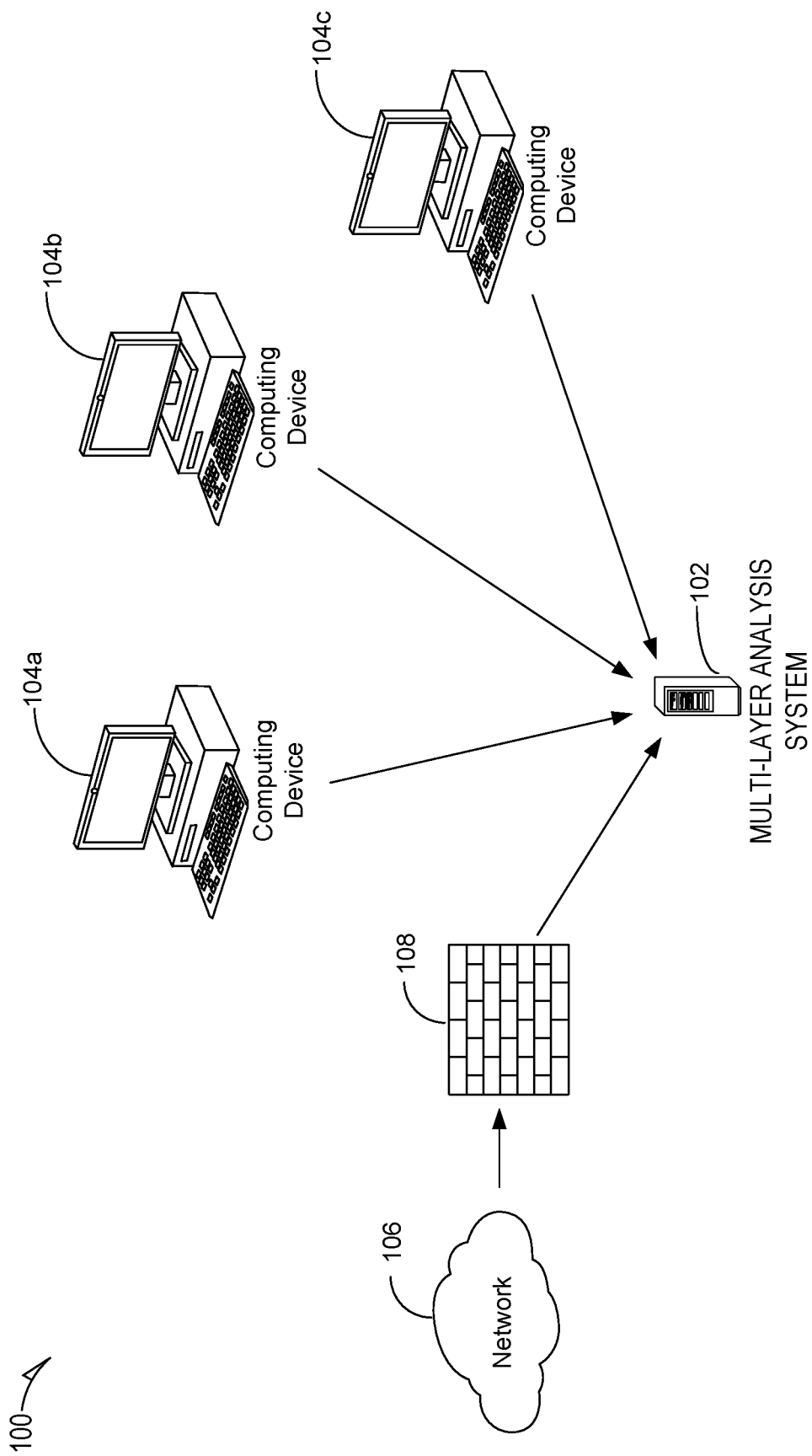
FIG. 1 is an overview diagram of a system implementing one or more of the disclosed embodiments.

As discussed above, modern cyberattacks are sophisticated and cause substantial damage to economic and national security. Given that many cyberattacks are distributed across multiple attack entry points and a single attack can manifest itself in a variety of manners, it is technically difficult to identify these attacks, as any one point of attack is not necessarily severe enough to be identified by modern methods as an attack or even a network security threat. Thus, identifying that multiple, relatively diverse attack vectors represents a technical problem. Moreover, this technical problem causes very substantial economic losses to the world economy. This technical problem also represents a national security threat.

The disclosed embodiments seek solve this technical problem and identify network security threats by classifying computing resources in relation to an observed computing activity or event. For example, some embodiments monitor a system event log or other resource to detect an event that occurred within a complex network system. Computing resources directly implicated by the event constitute a first layer or "layer one (1)" group of computing resources. For example, if a login failure occurred due to an incorrect password, the first layer of computing resources includes, in some embodiments, the computer upon which the login failure occurred, and the process that attempted the login.

The disclosed embodiments then identify, based on information relating to the layer one (1) computing resource, a set of layer two (2) resources with respect to the event. The layer two resources include, for example, one or more of a process that created the first process, and any files loaded by the first process or any first layer processes, irrespective of the file's relationship to the event itself. If any files are included in the layer one (1) resources, any processes writing to or reading from those files are classified as layer two (2) resources. Further, any previous versions of one or more files included in layer one (1) computing resources are also classified as layer two (2) computing resources. Once the computing resources are identified in layer 1 and layer 2 (e.g. layer n and layer n+1), correlations between the identified resources are established. Based on those correlations, a mitigating action is determined, which may reduce an impact of a security risk introduced by the correlated computing resources. Note that while the example above describes two layers, some embodiments iteratively identify layers of computing resources, with, for example, a layer n+2 having a similar relationship to layer n+1 resources discussed above as the layer n+1 resources have with the layer n resources discussed above. Any number of layers is contemplated, including 2, 3, 4, 5, 6, 7, 8, 9, 10, 11, 12, 13, 14, 15, 16, 17, 18, 19, 20 or more layers.

Some embodiments perform one or more of the steps below to identify relationships between computing system events:

1. Gather records that indicate Points of Interest (POIs), which reflect any security-oriented events of relevance. For example, POIs could arise from alerts generated by anti-malware analytics or investigations, as well as from artifacts of threat intelligence found in data.

2. Define a set of core features for common data sources (e.g., logs and telemetry, such as file operations and process creation). These baseline features are geared towards capturing the similarity of user or machine activity, as evidenced by various system information (e.g., similar file paths or hashes of executed binaries, or matching time windows of operations).

3. Define a set of extended features based on layers of security records. Each layer consists of records immediately related to records in the previous layer, with the initial layer constructed from POI information. The set of extended features is defined as the cross product of the sets of core features from each layer. In addition, a timestamp difference between pairs of features is an additional feature utilized in at least some embodiments. This captures the notion of similarity via temporal proximity.

Using these building blocks, some of the disclosed embodiments compute, weight or aggregate feature values over pairs of records. If a weighted sum exceeds a particular threshold, the records are deemed sufficiently similar to connect. Some embodiments generate graphs in which these similar records (nodes) are linked by edges, providing a visualization of reconstructed attacks.

In some embodiments, one or more of the feature weights and thresholds may be set manually, based on experiments and empirical data. Alternately, the weights and thresholds may be adjusted automatically via a machine learning implementation that leverages data from known attacks or penetration tests. For example, these values may be derived from the coefficients of a trained linear classifier.

Thus, by identifying multiple layers of computing resources, and determining similarities between the identified computing resources and events, the disclosed embodiments are able to establish relationships between multiple computing resources and/or events that otherwise would be unknown. Once the multiple computing resources associated with a particular network security event are established, some embodiments compare the identified computing resources against known signatures of nefarious activities, and also identify actions to mitigate the attack. The determination and application of these mitigating actions represents a technical solution to the problem of identifying and resolve diversified attacks on a computer system before the attacks cause substantial damage to the computing system.

FIG. 1 is an overview diagram of a system implementing one or more of the disclosed embodiments. FIG. 1 shows a system 100 that includes multiple computing system components. The computing system components include a multi-layer analysis system 102. The computing system components also include computing devices 104a 104b, and 104c. The multi-layer analysis system 102 and the computing devices 104a-c are separated from a network 106 by a network firewall 108.

The multi-layer analysis system 102 receives information relating to events occurring on one or more of the computing devices 104a, 104b, and 104c. The multi-layer analysis system also receives information from the network firewall 108. The information received from the computing devices 104a-c and/or the network firewall 108 include, for example, event logs, alert notifications, or other indications of computing activity that occurred on the respective device. The multi-layer analysis system 102 analyzes this information and identifies correlations between different events occurring on these computing system components. Based on the correlations between the different events, some of the disclosed embodiment determine that a subset of the events detected represent a security threat to the system 100. Some of the disclosed embodiments then perform a mitigating action to mitigate any impact associated with the security threat. For example, in some embodiments, the multi-layer analysis system 102 modifies or updates a network firewall access policy (e.g. of the network firewall 108) to prevent network communication that is implementing the identified security threat. In other embodiments, one or more alerts are generated to notify security personnel to the existence of the threat.

Figure 2:
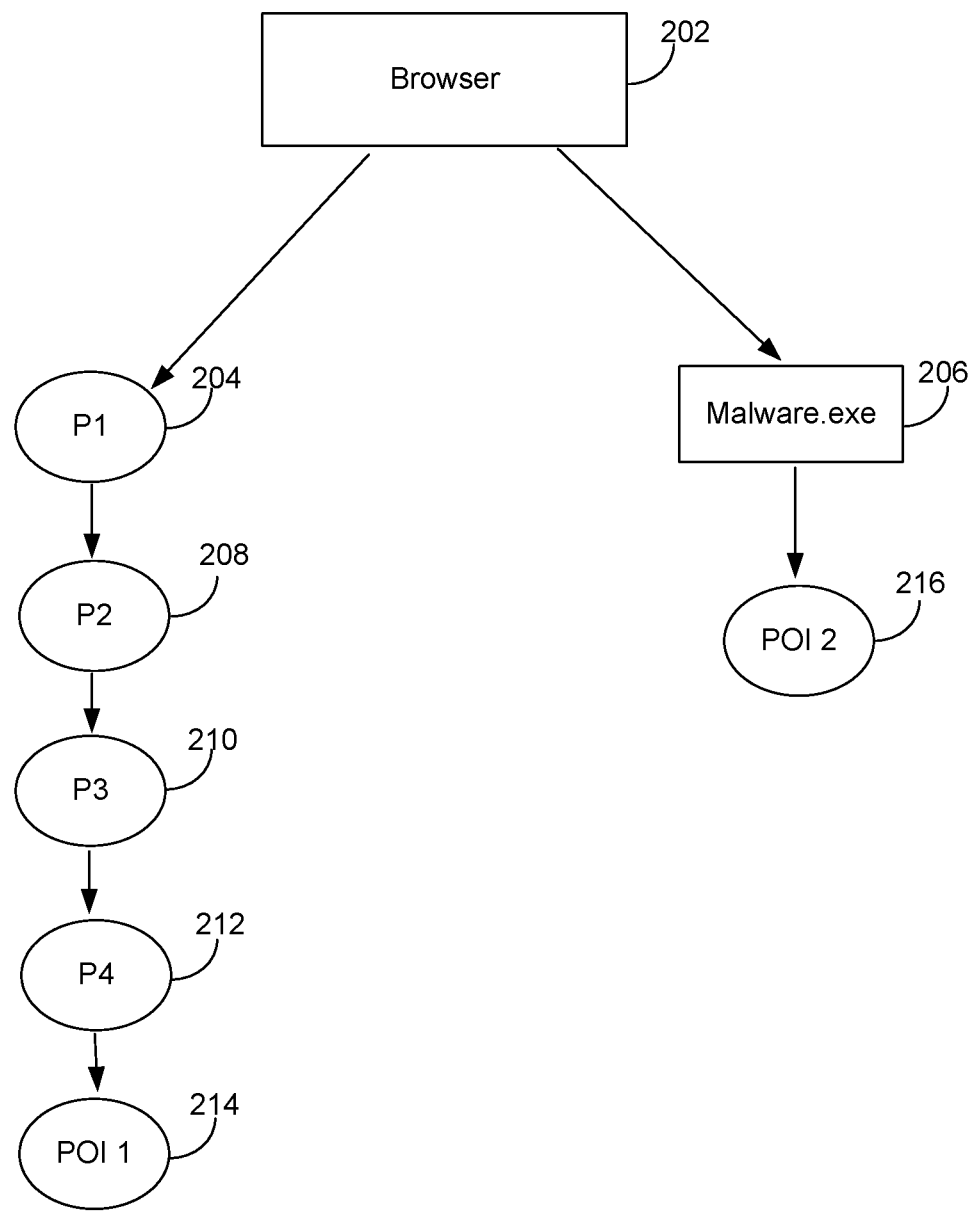
FIG. 2 is a diagram showing points of interest, first layer computing resources, and second layer computing resources.

FIG. 2 is a diagram showing points of interest, first layer computing resources, and second layer computing resources. FIG. 2 shows a browser application 202. FIG. 2 shows that the browser application 202 generated a process 204 and also initiated an executable file 206. The process 204 spawned a second process 208. The second process 208 spawned a third process 210. The third process 210 spawned a fourth process 212. The fourth process 212 generates a system event 214, shown as a point of interest (POI). The system event 214 is written to an event log in at least some embodiments. The executable file 206 also generates a system event 216, shown as point of interest 2 (POI 2). In an example embodiment, a similarity between the system event 214 and the system event 216 provides for the establishment of the browser application 202 being a source of a security threat. In order to establish the browser application 202 as a common source of both the system event 214 and the system event 216, the disclosed embodiments analyze not only the system event 214 and the system event 216, but also one or more processes that generated each of the events, and parent processes of those processes (e.g. the third process 210 and executable file 206). Parent processes of the third process 210 are identified (e.g. second process 208), and the executable file 206 (e.g. the browser application 202). Some of the disclosed embodiments further analyze the ancestors of the identified process until the browser application 202 is identified as both a common ancestor of the fourth process 212 and of the executable file 206.

To identify the browser application 202 as a common ancestor of both the system event 214 and the system event 216, several challenges need to be overcome. For example, the spawning of each of the processes 204, 208, and/or 210 spans, in some embodiments, a relatively large period of time. For example, days elapse in some cases between the creation of process 204 and fourth process 212. In some cases, it can be difficult to establish commonality between the various processes 208, 210, and 212, the system event 214, and/or the executable file 206. For example, hash values of each of these processes are different in some embodiments. Similarly, different process names and/or process identifier are different in some circumstances. Thus, to establish commonality between computing resources, the disclosed embodiments utilize a multi-factor similarity analysis, that scores a similarity of two computing resources based on many different attributes, as discussed further below.

Figure 3:
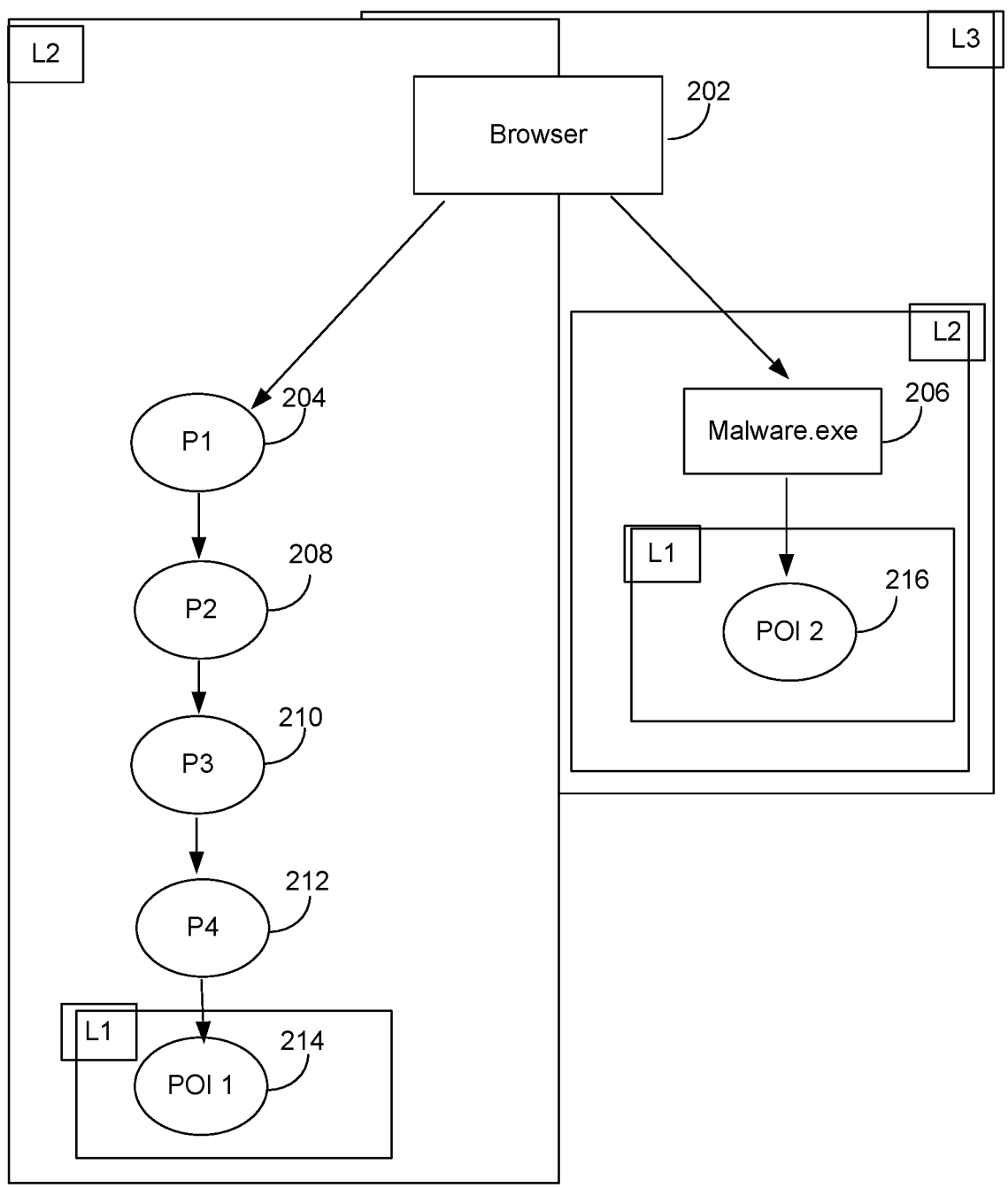
FIG. 3 is a diagram illustrating a classification of computing resources into different layers.

FIG. 3 is a diagram illustrating a classification of computing resources into different layers. FIG. 3 shows the same computing resources as those of FIG. 2. FIG. 3 shows that point of interest or system event 214 is classified as a layer one (1) computing resource. Similarly, the system event 216 or POI 2 is also classified as a layer one (1) computing resource. The classification of the system events 214 and 216 as layer one (1) computing resources is based, in some embodiments, on a notification channel through which the disclosed embodiments are notified of the system event 214 and the system event 216. For example, the system events 214 and 216 are written, in some embodiments, to a system event log that stores information related to exceptional conditions detected within a computing system.

FIG. 3 also shows computing resources classified as layer two resources. For example, FIG. 3 shows that each of the processes 204, 208, 210, and 212 are layer two (2) computing resources. Similarly, the executable file 206 is classified as a layer two (2) computing resource. Some embodiments identify layer n (e.g. two (2)) computing resources based on other computing resources classified as layer n−1 (e.g. one (1)) computing resources. For example, some embodiments identify one or more parent processes of layer n computing resources and classify the parent processes as layer n+1 computing resources. Some embodiments identify one or more files loaded by layer one computing resources and classify the identified files as layer two computing resources. If a layer one computing resource is a file, some embodiments classify any process writing to the file as a layer two (2) computing resource. One or more previous versions of the file of layer n are also classified as a layer n+1 computing resource in at least some embodiments. Previous versions of a file are identified, in some embodiments, as those files having an equivalent file system path, but different hash values. While FIG. 2 can be interpreted to indicate that layer two computing resources include resources classified as layer one (1), FIG. 3 also shows computing resource classified as layer three computing resources. Some embodiments employ a methodology similar to finding the layer two resources in order to identify the layer three resources. When identifying layer 3 resources, layer two resources are layer n resources, and layer 3 resources are layer n+1 resources as described above.

As shown by FIG. 3, a first set of layer 3 resources identified based on POI 1 system event 214 overlaps with a second set of layer three resources identified based on POI 2 system event 216. In those embodiments that determine a similarity score between resources of different layers, equivalent resources would of course have a relatively high similarity score. This relatively high similarity score of common ancestors of system event 214 and system event 216, contributes, in some embodiments, to the identification that the system event 214 and system event 216 are part of a chain of events that represent a security risk.

Figure 4:
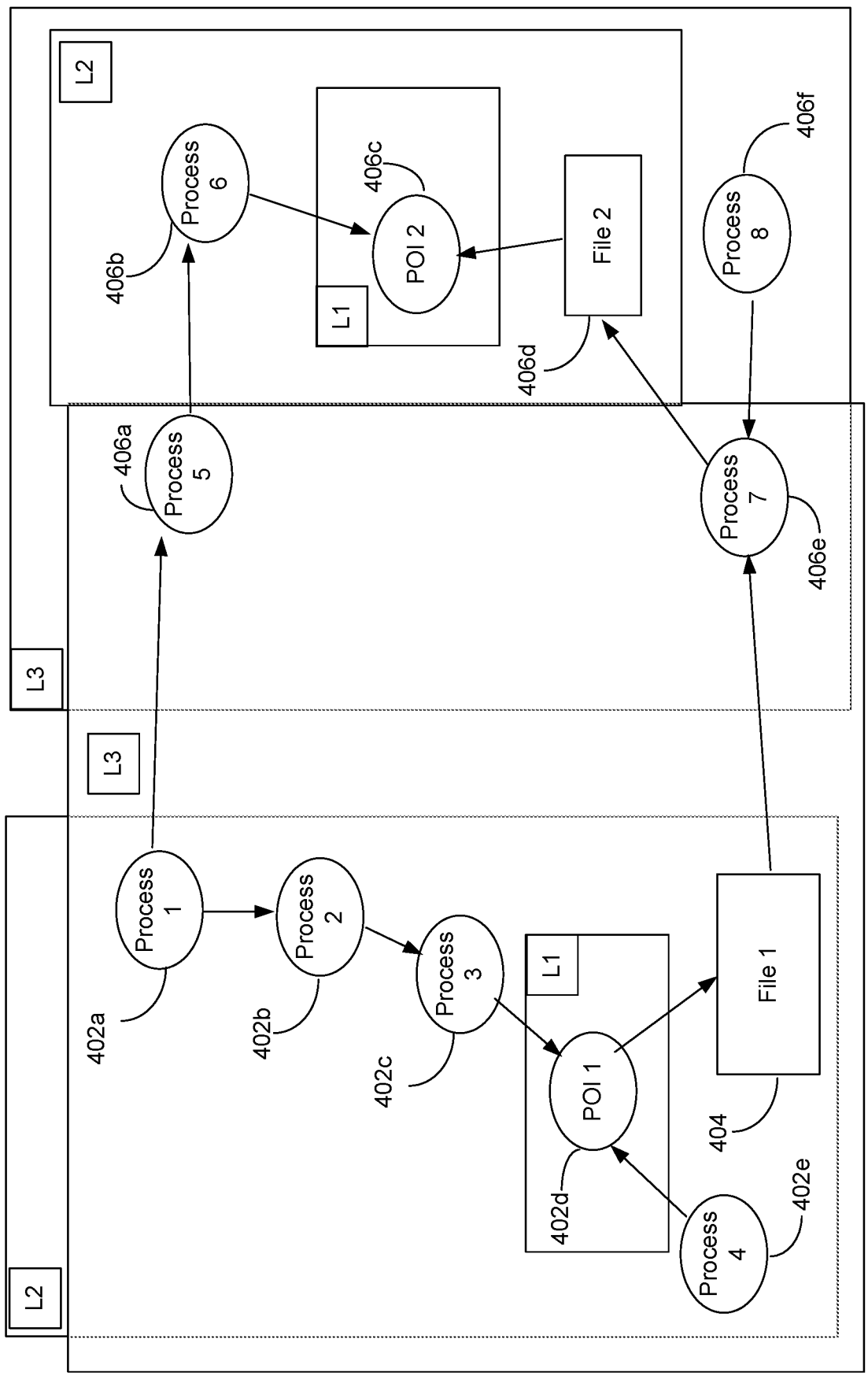
FIG. 4 shows another example of computing resources organized into layers.

FIG. 4 shows another example of computing resources organized into layers. FIG. 4 shows a first process 402a that spawns a second process 402b. The second process 402b spawns a third process 402c. The third process 402c performs an activity that generates a system alert or point of interest 402d. As point of interest 402d is a generated alert, it is classified by the disclosed embodiments as a layer one computing resource. FIG. 4 also shows a fourth process 402e that contributes to generation of the system alert or point of interest 402d. FIG. 4 shows that the point of interest 402d references a file 404. FIG. 4 indicates that each of the first process 402a, second process 402b, third process 402c, fourth process 402e, and file 404 are classified as layer two (2) computing resources.

FIG. 4 further shows a fifth process 406a that is spawned by the first process 402a. The fifth process 406a spawns a sixth process 406b, which generates a system event or point of interest 406c. A seventh process 406e is shown reading data from the file 404. An eighth process 406f spawned the seventh process 406e. The seventh process 406e is shown writing data to a second file 406d. The second point of interest 406c is shown reading data from the second file 406d. Since the second point of interest 406c reads data from the second file 406d, the second file 406d is classified as a second layer computing resource. The sixth process 406b generated the system event or point of interest 406c, and thus is also classified as a layer two computing resource. Process 5 406a spawned the sixth process 406b, and thus is classified at a layer above process 6, at layer 3. A seventh process 406e wrote data to a second file 406d, which is a layer two (2) computing resource. Thus, the seventh process 406e is classified as a layer three computing resource.

FIG. 4 shows that the second point of interest 406c is classified as a layer one computing resource. Process 8, which spawned the seventh process 406e is classified as a layer 3 resource.

FIG. 4 also shows that process 5 406a and the seventh process 406e are included in a layer 3 analysis that begins with the point of interest 402d. The seventh process 406e is also included in the layer 3 analysis that begins with the point of interest 402d.

Figure 5A:
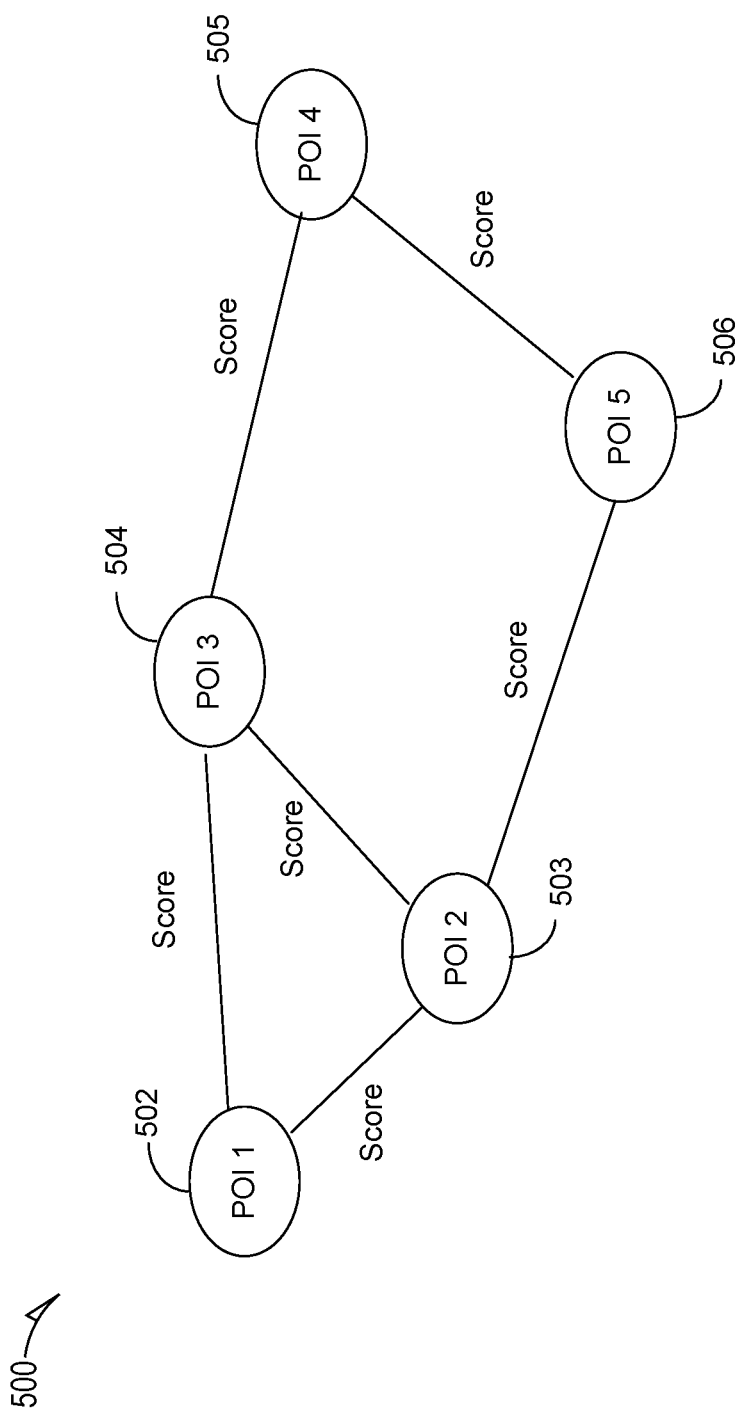
FIG. 5A shows an example provenance graph that is generated in one or more of the disclosed embodiments.

FIG. 5A shows an example provenance graph that is generated in one or more of the disclosed embodiments. The provenance graph includes nodes representing computer resources. The nodes are node 502, node 503, node 504, node 505, and node 506. Each of the computer resources of the provenance graph 500 are also a point of interest. Some of the disclosed embodiments generate a provenance graph such as the provenance graph 500. The nodes of the provenance graph are linked by edges. Each edge is associated with a score, which represents a similarity between two points of interest connected by the edge. Some of the disclosed embodiments determine that points of interest having a similarity score meeting a criterion are likely part of a common network security threat. In some embodiments, a linkage between more than two points of interest may be established. For example, if a similarity between points of interest represented by node 502 and 504 meets the criterion, and a second similarity between points of interest represented by node 503 and the point of interest represented by node 504 meets the criterion, then some embodiments determine that each of the points of interest represented by nodes 502, 503, and 504 are associated with a common network security event. Some embodiments then determine a mitigating action to take based on this determination. For example, some embodiments may change an access policy of a firewall, or perform other action to disrupt the identified security threat.

Figure 5B:
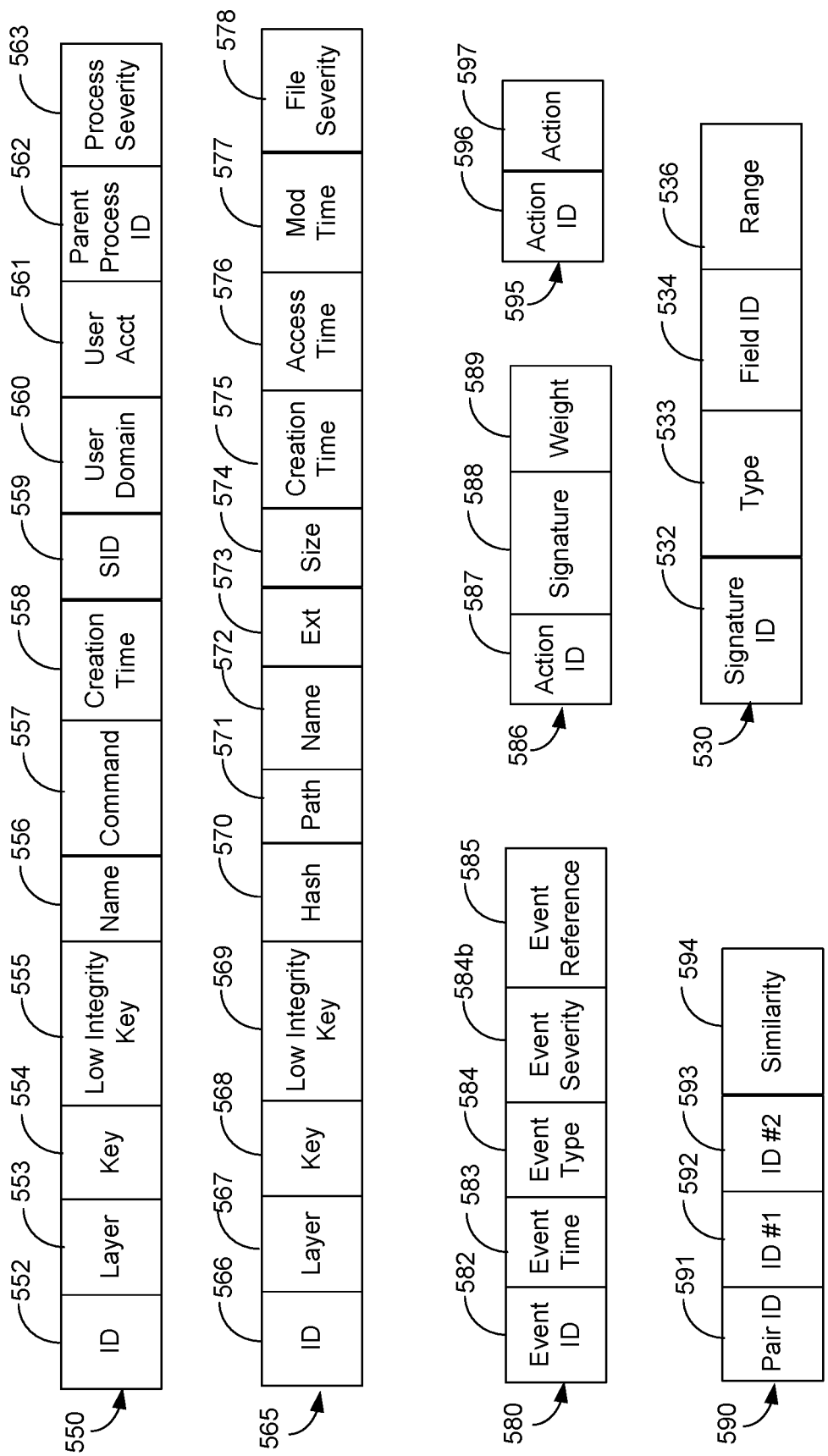
FIG. 5B shows example data structures, one or more of which are implemented in one or more of the disclosed embodiments.

FIG. 5B shows example data structures, one or more of which is implemented in one or more of the disclosed embodiments. While the example data structures of FIG. 5B are discussed below as relational database tables, in various embodiments, a variety of different data structure types are employed. For example, various embodiments utilize one or more of relational database tables, unstructured data stores, trees, linked lists, queues, arrays, or any other method of organizing data.

FIG. 5B shows a process table 550, file table 565, event table 580, action signature table 586, paired features table 590, and action table 595.

The process table 550 includes a process identifier field 552, layer field 553, process key field 554, low integrity process key field 555, process name field 556, command field 557, process creation time field 558, security identifier field 559, process user domain field 560, user account field 561, parent process identifier field 562, and process severity field 563. The process identifier field 552 uniquely identifies a particular process that has been identified as a computing resource by the disclosed embodiments. The layer field 553 identifies a layer associated with the identified process. The process key field 554 identifies a process key of the identified process. The low integrity process key field 555 defines a low integrity process key of the identified process. The process name field 556 defines a process name of the identified process. The command field 557 identifies a command line used to create or spawn the identified process. The process creation time field 558 identifies a creation time of the identified process. The security identifier field 559 identifies a security identifier of the identified process. The process user domain field 560 identifies a user domain under which the identified process logged in or established a session. The user account field 561 identifies a user account under which the identified process logged in or established a session. The parent process identifier field 562 identifies a parent process of the identifier process. The parent process identifier field 562 is used, in some embodiments, to identify one or more ancestors of the identified process. The process severity field 563 defines a severity associated with or assigned to the identified process (e.g. low severity, medium severity, high severity). In some embodiments, high severity represents a very "bad" attribute while low severity represents a relative benign attribute.

The file table 565 includes a file identifier field 566, layer field 567, file key field 568, low integrity file key field 569, hash field 570, path field 571, file name field 572, file extension field 573, file size field 574, file creation time field 575, file access time field 576, file modification time field 577, and file severity field 578. The file identifier field 566 defines a uniquely identifier of a particular file that has been identified as a computing resource by the disclosed embodiments. The layer field 567 defines a layer in the hierarchy discussed above to which the identified file is assigned. The file key field 568 identifies a key value of the identified file. The low integrity file key field 569 identifies a low integrity file key of the identified file. The hash field 570 identifies a has value of contents of the identified file. The path field 571 defines a file system path of where the identified file resides in a file system. The file name field 572 defines a name of the identified file. The file extension field 573 defines a file extension of the identified file. The file size field 574 defines a size (in bytes, words, or another unit of size) of the identified file. The file creation time field 575 defines a time at which the identified file was created. The file access time field 576 defines a time at which the identified file was last or most recently accessed. The file modification time field 577 defines a time at which the identified file was last modified. The file severity field 578 defines a severity associated with or assigned to the identified file (e.g. low severity, medium severity, high severity). As discussed above, in some embodiments, high severity represents a very "bad" attribute while low severity represents a relative benign attribute.

The event table 580 includes an event identifier field 582, event time field 583, event type field 584, an event severity field 584b, and an event reference field 585. The event identifier field 582 identifies a unique system event, such as an event obtained from a system log, web server log, or other log of system events. The event time field 583 identifies a time of the event. The event type field 584 indicates a type of the event. Example event types include failed login/bad password, attempt to access a file without permissions, bad password for root account, a rate of inbound connection requests exceeded a threshold, or other events within a computing system. The event severity field 584b defines a severity of the event (e.g. low severity, medium severity, or high severity). The event reference field 585 references a computing resources, such as process or file identified in the process table 550 or file table 565.

The action signature table 586 includes an action identifier field 587, signature identifier field 588, and weight field 589. The action identifier field 587 uniquely identifies an action that is performed, in some embodiments, if signatures specified for the action match one or more computing system resources identified in a group of computing system resources, as discussed below with respect to at least FIG. 7. The weight field 589 specifies a weight to be added to a cumulative weight for the identified action if the signature specified by the signature identifier field 588 is satisfied by the group of computing resources being evaluated. The cumulative weight is discussed further below with respect to FIGS. 6 and/or 7.

The action table 595 includes a signature identifier and an action field 597. The action identifier field 596 uniquely identifies an action and is cross-referenceable, in some embodiments, with the action identifier field 587. The action field 597 defines an action to perform. Some embodiments may predefine identifies to different actions, and the action field 597 indicates one of the predefined identifiers. Performance of the action is then performed based on the predefined identifier. In some embodiments, the action field 597 includes data that dynamically defines an action. For example, the action field 597 defines, in some embodiments, an API name and/or parameter values for the API to facilitate performance of the action. In some embodiments, the action field 597 defines one or more regular expressions that are applied to one or more of the process table 550, file table 565, and/or event table 580 to extract or otherwise determine input parameters for the API. For example, a regular expression stored in the action field 597, in some embodiments, extracts a process identifier from the process table 550 for a computing system resource included in a group of resources associated with a system problem.

The paired features table 590 includes a pair identifier field 591, a first feature identifier field 592, a second feature identifier field 593, and a similarity score field 594. The pair identifier field 591 uniquely identifies a pair of features. The first feature identifier field 592 and second feature identifier field 593 each identify a feature included in the identified pair. The first feature identifier field 592 and second feature identifier field 593 identify a process in the process table 550, a file in the file table 565, or an event in the event table 580. Other types of features are paired in some embodiments. The similarity score field 594 defines a similarity score for the paired features. One embodiment of determining similarity scores for a pair of features (or multiple pairs of features, is discussed below with respect to FIG. 7.

The signature table 530 includes a signature identifier field 532, type field 533, field identifier field 534, and a range field 536. The signature identifier field 532 uniquely identifies a signature and can be cross referenced, at least in some embodiments, with the signature identifier field 588. The type field 533 defines a type of the signature. For example, the type field 533 identifies, in some embodiments, whether the signature is applied to computing system resources included in the process table 550, file table 565, or event table 580. The field identifier field 534 identifies a field that is compared to the signature. Thus, for example, the field identifier field 534 identifies any one of the fields of the process table 550 for process type signatures, any one of the fields of the file table 565 for file type (e.g. via field 533) signatures, or any one of the fields of the event table 580 for event type (e.g. via field 533) type signatures. This is just one example implementation of a signature-based identification of a mitigating action that is implemented in one or more of the disclosed embodiments. Other embodiments use alternative means of identifying a mitigating action based upon one or more identified computing resources.

Figure 6:
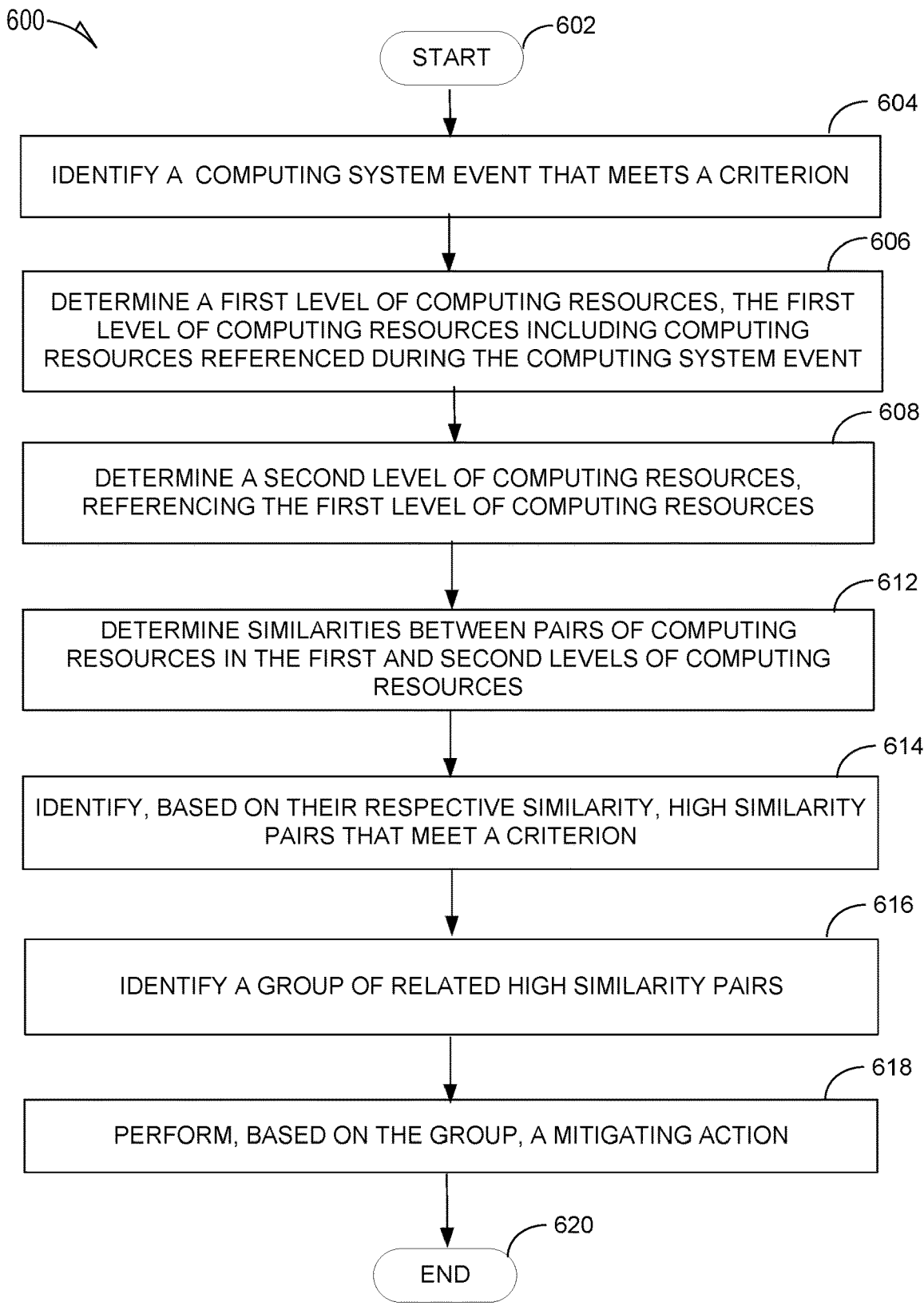
FIG. 6 is a flowchart of a method for identifying a potential security threat and taking mitigating action based on the identified threat.

FIG. 6 is a flowchart of a method for identifying a potential security threat and taking mitigating action based on the identified threat. In some embodiments, one or more of the functions discussed below with respect to FIG. 6 and method 600 are performed by hardware processing circuitry. For example, in some embodiments, instructions (e.g. instructions 824 discussed below) stored in a memory (e.g. memory 804 and/or 806 discussed below) configure the hardware processing circuitry (e.g. processor 802 discussed below) to perform one or more of the functions discussed below with respect to method 600 or FIG. 6.

After start operation 602, method 600 moves to operation 604, where a computing system event that meets a criterion is identified. In some embodiments, the computing system event meet one or more criterion that identifies that the event is exceptional or out of the ordinary. In some embodiments, the criterion evaluates a severity of the event, and identifies an event having sufficient severity (e.g. severity above a predefined threshold severity). In some embodiments, a plurality of different computing system events meet the criterion or criteria and thus a plurality of computing system events are identified in operation 604.

In some embodiments, the computing system event relates to cross-host network communications associated with the computing system event. In some embodiments, operation 604 monitors an event log of one or more computing devices (e.g. computing devices 104*a-c*) to identify the computing system event (e.g. failed logins and/or blocked file access). For example, an event log indicates, in some embodiments, an unsuccessful login attempt, or a request to access a file for which the requestor did not have appropriate permissions. Other sources of computing system events include firewall logs (e.g. blocked connection attempts), anti-malware events (e.g. an attempt to execute a known malware binary or a binary exhibiting suspicious behavior), webserver logs (e.g. request URLs containing known attack signatures or suspicious content), and mail logs (e.g. incoming email with suspicious attachment or an opened email with a user-clicked attachment). In some embodiments, these event log entries identify associated activities that generated the event. For example, a failed login attempt event identifies, in some embodiments, a login activity. The unauthorized file access identifies an activity of attempting to access the file. In some embodiments, operation 604 records, for each computing activity identified, information in the event table 580.

In operation 606, a first layer of computing resources (referred to below as layer n) are identified. The first layer of computing resources are those resources referenced during any of the computing system events or activities identified in operation 604. In some embodiments, a first layer of computing resources are those resources that performed some action or underwent some state transition during the event identified in operation 604. Thus, for example, if the event is a failed login attempt, layer one resources include a process performing the login attempt. In some embodiments, ancestor processes of a process actively causing the event are also included in first layer computer resources.

A file accessed before the login attempt by the process is not a layer one computer resource with respect to the failed login attempt in at least some embodiments. Instead, in these embodiments, a computer upon which the login attempt was executed would be a layer one computing resource with respect to the login attempt, as it actively performed the login attempt.

As, in some embodiments, layer one computing resources are those resources active or changing state "during" the identified activity or event, some embodiments determine a time window defining when the activity or event is performed/caused. In some embodiments, this time window ends when information recording the activity is written to an event log, when a result of the activity is generated, or another notification of the activity is generated. In some embodiments, the time window begins when an initial action to accomplish the activity is performed. The initial action is defined as an action that has a single purpose, that of accomplishing the activity or event. Thus, in these embodiments, an action that can be in the furtherance of a different activity or event is not an initial action.

Some embodiments partition different layers of computing resources into different portions or types of memory. For example, since layer one (1) computing resource information is accessed more frequently by some of the disclosed embodiments, than resource information for layers greater than layer one, some embodiments store layer one computing resource information in a random-access memory cache or memory having relatively fast access properties. Computing resource information relating to computing resources classified in layers greater than layer one are stored, in some embodiments, in a slower memory technology that provides more cost-effective storage of larger amounts of data, such as a disk-based memory or other stable storage technology. Some embodiments of operation 606 store information relating to each of the identified computing resources of layer n (e.g. one (1) in one or more of the process table 550 and/or the file table 565. Some embodiments store information relating to other types of computing resources beyond processes and files.

In operation 608, an n+1 layer (e.g. second layer) of computing resources is determined. The n+1 layer of computing resources are those resources referencing computing resources included in a nth layer (e.g. first layer) determined in operation 606. In some embodiments, n+1 layer computing resources include processes that spawned any processes or threads included in layer n computing resources. Any files loaded by processes include in the layer n computing resources are classified as n+1 layer computing resources in some embodiments. Files read or written to by processes identified as layer n computing resources are also classified as layer n+1 resources, at least in some embodiments. Previous versions of files included in the layer n computing resources are classified as layer n+1 computing resources in at least some embodiments. Note that some embodiments of operation 608 perform multiple iterations of computer resource layer determination. For example, after a second layer computing resources are identified (e.g. n=1 and n+1=2), a third layer of computing resources are identified, with the second layer computing resources used as a basis for determining the third layer computing resources (e.g. n=2 and n+1=3). Note however that methods used to identify layer one computing resources differ, at least in some respects, from techniques used to identify resources in any layer greater than one. Generally, identification of any layer of resources greater than the first layer rely on the functions discussed above with respect to operation 608. Identification of layer one resources are described above with respect to operations 604 and/or 606. Some embodiments of operation 608 store information relating to each of the identified computing resources in layer n+1 in one or more of the process table 550 and/or the file table 565. Some embodiments store information relating to other types of computing resources beyond processes and files.

In operation 612 similarities between pairs of two computing resources is determined. The pairs of computing resources are generated, in some embodiments, from computing resources included in one or more of the first and second layers of computing resources. Said another way, operation 612 identifies, in at least some embodiments, pairs of computing resources and/or pairs of computing events. A similarity between members of each pair is then determined.

Some embodiments determine each possible pair of computing resources included in the first (layer n) and second (layer n+1) layer computing resources. Some embodiments of operation 612 also determine similarities between two computing system events and/or activities included in a single pair/combination. A similarity between members of each pair/combination is then determined.

How similarity scores are generated differs by embodiment. In some embodiments, one or more of the following Boolean values are determined: whether the two resources have a common process key, a common low integrity process key, a common process name (or an edit distance<predefined threshold), common process command, a creation time of each process is within a predefined elapsed time, a common user security identifier (SID), a common user domain, a common user account, a process creation time difference between two processes that is less than a predefined process creation different threshold, a common ancestor process, a common file key, a common low integrity file key, a common file hash, a common file path, a common file name (or file names within a predefined edit distance threshold), a common file extension, a common file directory/path, a difference in file size that is below a predefined threshold, a file creation time difference between two files that is less than a predefined threshold, a most recent file access time difference between two files that is less than a predefined threshold, or a most recent file modification time difference between two files that is less than a predefined threshold. After one or more of these Boolean values are established between the pair of computing resources, the Boolean values are used to determine a similarity score for the pair. Some embodiments obtain feature values for one or more of the features described above from the process table 550, file table 565, and/or event table 580. The pairs of features are stored, in some embodiments, in the paired features table 590.

In operation 614, high similarity pairs of computing resources are identified. In some embodiments, one or more criterion are applied to each of the pairs to identify the high similarity pairs. For example, the criterion evaluates, in some embodiments, whether the two computing resources included in a pair have a similarity above a predefined threshold value.

Operation 616 identifies a group of high similarity pairs that exhibit a relationship to each other. In some embodiments, the relationship between pairs in the identified group is that each pair in the group shares a resource with at least one other pair in the group. For example, if pairs (A, B), (B, C), (C, D), and (Y, Z) are identified as having similarities meeting a criterion by operation 614, operation 616 identifies a group of resources including A, B, C, and D. Such an embodiments can be described as using the property of transitivity to establish relationships between resources given high similarity pairs of computing resources.

Some embodiments assign severities to one or more computing resources and/or events based on other computing resources and/or events included in the identified group. For example, if one event or computing resource in the group is associated with a "high" severity, other computing resources in the group are also assigned a high severity, at least in some embodiments.

Some embodiments of operation 616 identify multiple groups of high similarity pairs. Each member of an identified group exhibits a relationship with other members of the identified group, for example, as described above. Some embodiments then prioritize or otherwise rank the multiple groups of pairs based on a severity of each of the groups. A group severity is determined, in some embodiments, as a highest severity of any member of the group. Thus, for example, if a first group of pairs includes a computing activity, resource, or event with a high severity, each computing resource in its respective group is assigned a high severity, and is ranked higher than a second group of pairs that have at most a medium severity computing activity, resource, or event. These embodiments then select the highest ranked group for analysis in operation 618, discussed below.

In operation 618, a mitigating action is determined based on the group of computing resources. In some embodiments, operation 618 identifies a computing resource being most common within the group of computing resources, and identifies a mitigating action based on that computing resource. For example, in some embodiments, a mitigating action is to shut down the most common computing resource. In some embodiments, the mitigating action is to prevent network access by the identified computing resource. In some embodiments, one or more accounts associated with the identified computing resource are locked, and/or any established sessions under those one or more accounts are automatically logged out (without human intervention).

In some embodiments, operation 618 generates one or more alert messages to one or more alert recipients. For example, various embodiments generate alerts via email, text, phone, and/or any other messaging technology. After operation 618 completes, method 600 moves to end operation 620.

Some embodiments of operation 618 identify a mitigating action by comparing the computing system resources included in the group of related pairs to action signatures. If a signature matches one of the computing resources included in the group, a weight associated with that signature is added to a cumulative score for a particular action. For example, some embodiments rely on a structure similar or equivalent to the action signature table 586. In these embodiments, for each action, a cumulative weight is determined. The cumulative weight is based on weights associated with any signatures matching any of the computing resources in the group. If a particular action has a cumulative weight above a threshold (representing a high confidence that the action is appropriate for the group of computing resources), and the cumulative weight of the particular action is the highest of any cumulative weight for the group of computing resources, the associated action is performed, in some embodiments, to mitigate a problem associated with the group of computing resources.

Computation of a signature varies by embodiment, but in some embodiments, is determined based on one or more of the fields of the process table 550 for process signatures, one or more of the field of the file table 565 for file signatures, or one or more of the fields of the event table 580 for event signatures. An example signature organization is discussed above with respect to the signature table 530 and FIG. 5B. For example, some signatures define ranges of values for one or more of the fields. If the values associated with a particular computing resource fall within the ranges, the computing resource is considered to match the signature. Some embodiments define signatures that span multiple computing resources in the group. For example, a signature defines a first set of ranges for a first computing resource in a group and a second set of ranges for equivalent or different fields for a second computing resource in the group. If both sets of ranges are satisfied by two computing resources in the group, the group of resources is considered to match the signature.

Figure 7:
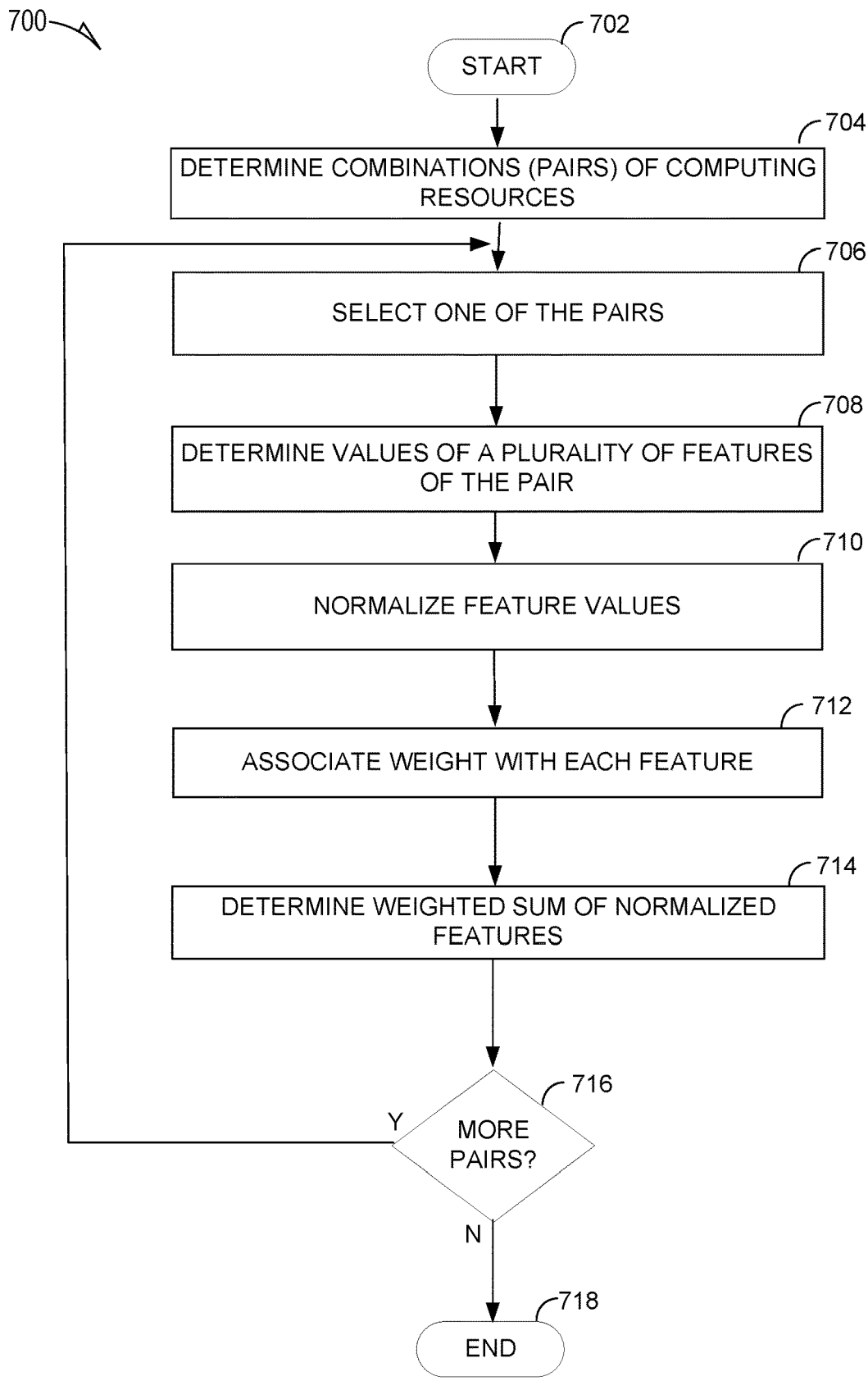
FIG. 7 is a flowchart of a method for identifying a potential security threat and taking mitigating action based on the identified threat.

FIG. 7 is a flowchart of a method for identifying a potential security threat and taking mitigating action based on the identified threat. In some embodiments, one or more of the functions discussed below with respect to FIG. 7 and method 700 are performed by hardware processing circuitry. For example, in some embodiments, instructions (e.g. instructions 824 discussed below) stored in a memory (e.g. memory 804 and/or 806 discussed below) configure the hardware processing circuitry (e.g. processor 802 discussed below) to perform one or more of the functions discussed below with respect to method 700 or FIG. 7.

After start operation 702, method 700 moves to operation 704, which determines combinations or pairs of computing resources. In some embodiments, the computing resources are obtained from multiple layers of analysis as described above with respect to FIG. 6 and method 600. For example, the computing resources are obtained from two, three, four, five, six, seven, eight, nine, ten, or more analysis layers.

Operation 706 selects one of the pairs determined in operation 704 (that has not been previously selected by a previous iteration of method 700, as discussed below). Operation 708 determines values of a plurality of features of the pair. For example, as discussed above, one or more of the values determined in operation 706 includes, whether the two resources have a common process key, a common low integrity process key, a common process name (or an edit distance<predefined threshold), common process command, a creation time of each process is within a predefined elapsed time, a common user security identifier (SID), a common user domain, a common user account, a common file key, a common low integrity file key, a common image hash, a common file path, a common file name (or file names within a predefined edit distance threshold), a common file extension, a common file directory/path, a difference in file size that is below a predefined threshold, a creation time difference between two files that is less than a predefined threshold, an access time difference between two files that is less than a predefined threshold.

In operation 710, the feature values are normalized. In some embodiments, normalization takes various forms depending on the type of features. For example, a normalization of a Boolean feature value ensures the value is either zero or one (1) in some embodiments. Normalization of a time difference is performed, in some embodiments, by representing the time difference as 1/the difference in minutes. A feature reflecting a size difference (e.g. a size difference between two files) is normalized, in some embodiments, by representing the feature as 1/the size difference in kilobytes.

In operation 712, a weight is associated with each feature.

In operation 714, a weighted sum of normalized features for the pair of computing resources is determined. In some embodiments, the weighted sum of features of two computing resources P1 and P2 is determined according to:

$$\text{Score}(P1, P2) = \text{Weight}\bigg(timediff(P1, P2) \times \text{norm}(timediff(P1, P2)) + \sum_{f \in \text{Feature Set}}^{\text{Num Features}} \sum_{l1=1}^{\text{Max Layer}} \sum_{l2=1}^{\text{Max Layer}} \text{Weight}(f) \times \frac{2}{L1+L2} \times \text{norm}(f_{L1,L2}(P1, P2))\bigg)$$

where:
timediff (P1, P2)—determines a time difference between two points of interest,
norm( )—a function that provides a normalized value of its parameter,
weight(f)—a weight assigned to feature,
$f_{L1, L2}$ (P1, P2) is a feature value of feature f of computing resources P1 and P2, with L1 and L2 defining a selection of each of P1 and P2.

In the example above, score (P1, P2) represents, in some embodiments, a similarity score of two computing resources as determined in operation 612. Note that each of P1 and P2 are, in various embodiments, computing system resources such as a particular file or process, and/or computing system events or activities, such as the generation of an event log.

Decision operation 716 determines if additional pairs of computing resources are available for analysis by method 700. If so, processing returns to operation 706, where another pair is selected. Otherwise, method 700 moves to end operation 718.

Figure 8:
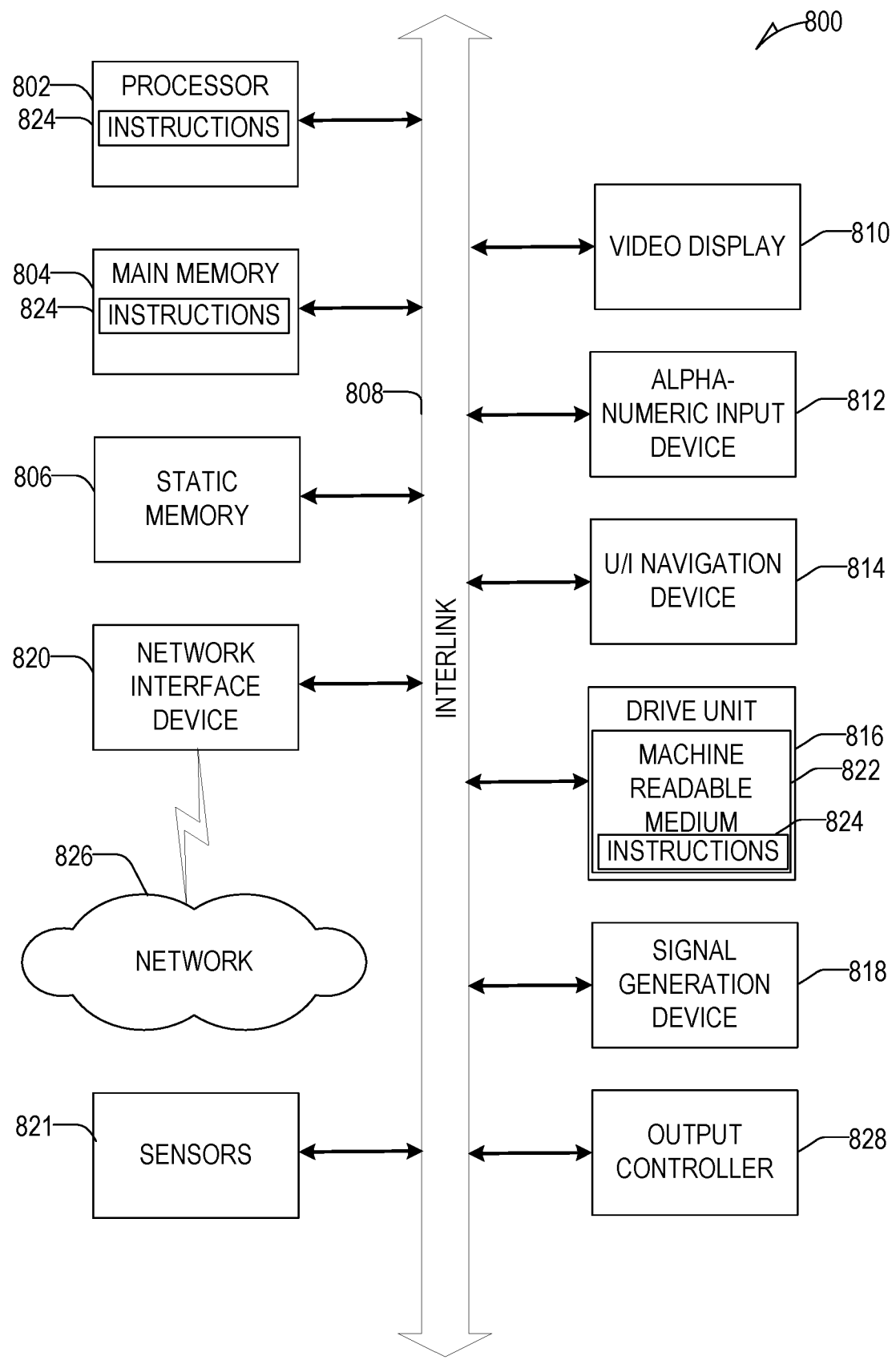
FIG. 8 illustrates a block diagram of an example machine 800 upon which any one or more of the techniques (e.g., methodologies) discussed herein may perform.

FIG. 8 illustrates a block diagram of an example machine 800 upon which any one or more of the techniques (e.g., methodologies) discussed herein may perform. In alternative embodiments, the machine 800 may operate as a standalone device or are connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 800 may perform one or more of the processes described above with respect to FIGS. 1-7 above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software may reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink 808 (e.g., bus). The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 are a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Examples, as described herein, may include, or may operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a system, comprising: hardware processing circuitry; one or more hardware memories storing instructions that when executed configure the hardware processing circuitry to perform operations comprising: identifying a computing system event that meets a criterion; determining a first layer of computing resources, the first layer of computing resources including computing resources referenced during the computing system event; determining a second layer of computing resources, the second layer including: parent processes of any first layer processes included in the first layer of computing resources, files loaded by the first layer processes, processes writing to files included in the first layer of computing resources, or previous versions of files included in the first layer of computing resources; determining similarities between pairs of two computing resources in the first and second layers of computing resources; determining, based on the determined similarities, high similarity pairs; identifying a group of related high similarity combinations; and performing, based on the group, a mitigating action.

In Example 2, the subject matter of Example 1 optionally includes wherein the mitigating action comprises: indicating the group in an alert message; and generating an alert based on the alert message.

In Example 3, the subject matter of any one or more of Examples 1-2 optionally include wherein performing the mitigating action comprises modifying a firewall access policy.

In Example 4, the subject matter of any one or more of Examples 1-3 optionally include a first memory, the operations further comprising storing, in the first memory, information including cross-host network communications associated with the computing system event, and processes initiating the cross-host network communications, and ancestor processes of the processes, wherein the first layer of computing resources is based on the information stored in the first memory, and wherein the determining of the second layer of computing resources is based on second information stored in a second memory.

In Example 5, the subject matter of Example 4 optionally includes wherein the first memory is a random-access memory cache, and the second memory is a disk-based memory.

In Example 6, the subject matter of any one or more of Examples 1-5 optionally include wherein the determining of the similarities comprises comparing one or more features of a pairs of processes, the one or more features including one or more of a process key, a low integrity process key, a process name, a process command, a process creation time difference, a user security identifier (SID), a domain, an ancestor process, or an account.

In Example 7, the subject matter of any one or more of Examples 1-6 optionally include wherein the determining of the similarities compares one or more features of a pairs of files, the one or more features including one or more of a file key, a low integrity file key, a file hash, a file path, a file name, a file extension, a file directory, a file size, a file creation time, a most recent file access time, or a most recent file modification time.

In Example 8, the subject matter of Example 7 optionally includes the operations further comprising determining a weight of each of the one or more features, wherein the determining of the similarities is based on the determined weights.

Example 9 is a method, comprising: identifying a computing system event that meets a criterion; determining a first layer of computing resources, the first layer of computing resources including computing resources referenced during the computing system event; determining a second layer of computing resources, the second layer including: parent processes of any first layer processes included in the first layer of computing resources, files loaded by the first layer processes, processes writing to files included in the first layer of computing resources, or previous versions of files included in the first layer of computing resources; determining similarities between pairs of two computing resources in the first and second layers of computing resources; determining, based on the determined similarities, high similarity pairs; identifying a group of related high similarity pairs; and performing, based on the group, a mitigating action.

In Example 10, the subject matter of Example 9 optionally includes wherein the mitigating action comprises: indicating the group in an alert message; and generating an alert based on the alert message.

In Example 11, the subject matter of any one or more of Examples 9-10 optionally include wherein performing the mitigating action comprises modifying a firewall access policy.

In Example 12, the subject matter of any one or more of Examples 9-11 optionally include storing, in a first memory, information including cross-host network communications associated with the computing system event, and processes initiating the cross-host network communications, and ancestor processes of the processes, wherein the first layer of computing resources is based on the information stored in the first memory, and wherein the determining of the second layer of computing resources is based on second information stored in a second memory.

In Example 13, the subject matter of Example 12 optionally includes wherein the first memory is a random-access memory cache, and the second memory is a disk-based memory.

In Example 14, the subject matter of any one or more of Examples 9-13 optionally include wherein the determining of the similarities comprises comparing one or more features of a pair of processes, the one or more features including one or more of a process key, a low integrity process key, a process name, a process command, a process creation time difference, a user security identifier (SID), a domain, an ancestor process, or an account.

In Example 15, the subject matter of any one or more of Examples 9-14 optionally include wherein the determining of the similarities compares one or more features of a pair of files, the one or more features including one or more of a file key, a low integrity file key, a file hash, a file path, a file name, a file extension, a file directory, a file size, a file creation time, a most recent file access time, or a most recent file modification time.

In Example 16, the subject matter of Example 15 optionally includes determining a weight of each of the one or more features, wherein the determining of the similarities is based on the determined weights.

Example 17 is a non-transitory computer readable storage medium comprising instructions that when executed configure hardware processing circuitry to perform operations comprising: identifying a computing system event that meets a criterion; determining a first layer of computing resources, the first layer of computing resources including computing resources referenced during the computing system event; determining a second layer of computing resources, the second layer including: parent processes of any first layer processes included in the first layer of computing resources, files loaded by the first layer processes, processes writing to files included in the first layer of computing resources, previous versions of files included in the first layer of computing resources; determining similarities between pairs of two computing resources in the first and second layers of computing resources; determining, based on the determined similarities, high similarity pairs; identifying a group of related high similarity pairs; and performing, based on the group, a mitigating action.

In Example 18, the subject matter of Example 17 optionally includes wherein performing the mitigating action comprises modifying a firewall access policy.

In Example 19, the subject matter of any one or more of Examples 17-18 optionally include wherein the mitigating action comprises: indicating the group in an alert message; and generating an alert based on the alert message.

In Example 20, the subject matter of any one or more of Examples 17-19 optionally include the operations further comprising storing, in a first memory, information including cross-host network communications associated with the computing system event, and processes initiating the cross-host network communications, and ancestor processes of the processes, wherein the first layer of computing resources is based on the information stored in the first memory, and wherein the determining of the second layer of computing resources is based on second information stored in a second memory.

In Example 21, the subject matter of Example 20 optionally includes wherein the first memory is a random-access memory cache, and the second memory is a disk-based memory.

In Example 22, the subject matter of any one or more of Examples 17-21 optionally include wherein the determining of the similarities comprises comparing one or more features of a pair of processes, the one or more features including one or more of a process key, a low integrity process key, a process name, a process command, a process creation time difference, a user security identifier (SID), a domain, an ancestor process, or an account.

In Example 23, the subject matter of any one or more of Examples 17-22 optionally include wherein the determining of the similarities compares one or more features of a pair of files, the one or more features including one or more of a file key, a low integrity file key, a file hash, a file path, a file name, a file extension, a file directory, a file size, a file creation time, a most recent file access time, or a most recent file modification time.

In Example 24, the subject matter of Example 23 optionally includes the operations further comprising determining a weight of each of the one or more features, wherein the determining of the similarities is based on the determined weights.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Various embodiments are implemented fully or partially in software and/or firmware. This software and/or firmware may take the form of instructions contained in or on a non-transitory computer-readable storage medium. Those instructions may then be read and executed by one or more processors to enable performance of the operations described herein. The instructions are in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A system, comprising:
hardware processing circuitry; and
one or more hardware memories storing instructions that when executed configure the hardware processing circuitry to perform operations comprising:
identifying computing system events that meet a criterion;
for each computing system event of the computing system events:
determining a first layer of computing resources, the first layer of computing resources including computing resources referenced during the computing system event;
determining a second layer of computing resources, the second layer including:
a parent process of a first layer process included in the first layer of computing resources,
a file loaded by the first layer process,
a process writing to a file included in the first layer of computing resources, or
a previous version of a file included in the first layer of computing resources;
identifying overlap between computing resources in the first and second layers of computing resources for a first computing system event of the computing system events and a second computing system event of the computing system events;
determining, based on the identified overlap, a similarity score;
associating, based on the similarity score, the first and second computing system events as parts of a larger individual computing system event; and
performing, based on determining the larger individual computing system event, a mitigating action.

2. The system of claim 1, wherein the mitigating action comprises:
indicating the larger individual computing system event in an alert message; and
generating an alert based on the alert message.

3. The system of claim 1, wherein performing the mitigating action comprises modifying a firewall access policy.

4. The system of claim 1, further comprising a first memory, the operations further comprising storing, in the first memory, information including cross-host network communications associated with the computing system event, and processes initiating the cross-host network communications, and ancestor processes of the processes, wherein the first layer of computing resources is based on the information stored in the first memory, and wherein the determining of the second layer of computing resources is based on second information stored in a second memory.

5. The system of claim 4, wherein the first memory is a random-access memory cache, and the second memory is a disk-based memory.

6. The system of claim 1, wherein the determining of the similarity score comprises comparing one or more features of a pair of processes, the one or more features including one or more of a process key, a low integrity process key, a process name, a process command, a process creation time difference, a user security identifier (SD), a domain, an ancestor process, or an account.

7. The system of claim 1, wherein the determining of the similarity score compares one or more features of a pair of files, the one or more features including one or more of a file key, a low integrity file key, a file hash, a file path, a file name, a file extension, a file directory, a file size, a file creation time, a most recent file access time, or a most recent file modification time.

8. The system of claim 7, the operations further comprising determining a weight of each of the one or more features, wherein the determining of the similarity score is based on the determined weights.

9. A method, comprising:
identifying computing system events that meet a criterion;
for each computing system event of the computing system events:

determining a first layer of computing resources, the first layer of computing resources including computing resources referenced during the computing system event;
determining a second layer of computing resources, the second layer including:
   a parent process of any first layer processes included in the first layer of computing resources,
   a file loaded by the first layer processes,
   a process writing to a file included in the first layer of computing resources, or
   a previous version of a file included in the first layer of computing resources;
identifying overlap between computing resources in the first and second layers of computing resources for a first computing system event of the computing system events and a second computing system event of the computing system events;
determining, based on the identified overlap, a similarity score;
associating, based on the similarity score, the first and second computing system events as parts of a larger individual computing s stem event; and
performing, based on determining the larger individual computing system event, a mitigating action.

10. The method of claim 9, wherein the mitigating action comprises:
indicating the larger individual computing system event in an alert message; and
generating an alert based on the alert message.

11. The method of claim 9, further comprising storing, in a first memory, information including cross-host network communications associated with the computing system event, and processes initiating the cross-host network communications, and ancestor processes of the processes, wherein the first layer of computing resources is based on the information stored in the first memory, and wherein the determining of the second layer of computing resources is based on second information stored in a second memory.

12. The method of claim 9, wherein the determining of the similarity score comprises comparing one or more features of a pair of processes, the one or more features including one or more of a process key, a low integrity process key, a process name, a process command, a process creation time difference, a user security identifier (SID), a domain, an ancestor process, or an account.

13. The method of claim 9. wherein the determining of the similarity score compares one or more features of a pair of files, the one or more features including one or more of a file key, a low integrity file key, a file hash, a file path, a file name, a file extension, a file directory, a file size, a file creation time, a most recent file access time, or a most recent file modification time.

14. A non-transitory computer readable storage medium comprising instructions that when executed configure hardware processing circuitry to perform operations comprising:
identifying computing system events that meet a criterion;
for each computing system event of the computing system events:
   determining a first layer of computing resources, the first layer of computing resources including computing resources referenced during the computing system event;
   determining a second layer of computing resources, the second layer including:
      a parent process of any first layer processes included in the first layer of computing resources,
      a files loaded by the first layer processes,
      a process writing to a file included in the first layer of computing resources, or
      a previous version of a file included in the first layer of computing resources;
identifying overlap between computing resources in the first and second layers of computing resources for a first computing system event of the computing system events and a second computing system event of the computing system events;
determining, based on the identified overlap, a similarity score;
associating, based on the similarity score, the first and second computing system events as parts of a larger individual computing system event; and
performing, based on the larger individual computing system event, a mitigating action.

15. The non-transitory computer readable storage medium of claim 14, wherein performing the mitigating action comprises modifying a firewall access policy.

16. The non-transitory computer readable storage medium of claim 14, wherein the mitigating action comprises:
indicating the larger individual computing system event in an alert message; and
generating an alert based on the alert message.

17. The non-transitory computer readable storage medium of claim 14, the operations further comprising storing, in a first memory, information including cross-host network communications associated with the computing system event, and processes initiating the cross-host network communications, and ancestor processes of the processes, wherein the first layer of computing resources is based on the information stored in the first memory, and wherein the determining of the second layer of computing resources is based on second information stored in a second memory.

18. The non-transitory computer readable storage medium of claim 14, wherein the determining of the similarity score comprises comparing one or more features of a pair of processes, the one or more features including one or more of a process key, a low integrity process key, a process name, a process command, a process creation time difference, a user security identifier (SID), a domain, an ancestor process, or an account.

19. The non-transitory computer readable storage medium of claim 14, wherein the determining of the similarity score compares one or more features of a pair of files, the one or more features including one or more of a file key, a low integrity file key, a file hash, a file path, a file name, a file extension, a file directory, a file size, a file creation time, a most recent file access time, or a most recent file modification time.

20. The non-transitory computer readable storage medium of claim 19, the operations further comprising determining a weight of each of the one or more features, wherein the determining of the similarity score is based on the determined weights.

\* \* \* \* \*